United States Patent [19]
Yaeger et al.

[11] Patent Number: 5,667,361
[45] Date of Patent: Sep. 16, 1997

[54] FLUTTER RESISTANT BLADES, VANES AND ARRAYS THEREOF FOR A TURBOMACHINE

[75] Inventors: Karl J. Yaeger, Coventry; Douglas E. Duke, Ellington; James A. Sunamoto, Glastonbury; William Henry Greene, Jr., South Windsor, all of Conn.

[73] Assignee: United Technologies Corporation, Hartford, Conn.

[21] Appl. No.: 527,999

[22] Filed: Sep. 14, 1995

[51] Int. Cl.$^6$ ............................................. F01D 5/22
[52] U.S. Cl. ........................... 416/193 R; 416/203
[58] Field of Search ........................... 416/193 R, 203

[56] References Cited

U.S. PATENT DOCUMENTS

| | | | |
|---|---|---|---|
| 1,893,184 | 1/1933 | Smellie . | |
| 3,216,699 | 11/1965 | Schoenborn | 416/203 |
| 3,477,795 | 11/1969 | Beesley | 416/191 |
| 3,536,417 | 10/1970 | Stiefel et al. | 416/223 |
| 3,837,761 | 9/1974 | Brown | 416/203 |
| 4,253,800 | 3/1981 | Segawa et al. | 416/203 |
| 4,474,534 | 10/1984 | Thode . | |
| 4,538,963 | 9/1985 | Sugio et al. | 416/203 |
| 4,798,519 | 1/1989 | Zipps et al. | 416/191 |
| 4,863,351 | 9/1989 | Fischer et al. . | |
| 5,000,660 | 3/1991 | Van Houten et al. . | |
| 5,156,529 | 10/1992 | Ferleger et al. | 416/203 |
| 5,160,242 | 11/1992 | Brown | 416/203 |
| 5,266,007 | 11/1993 | Bushnell et al. | 416/178 |
| 5,286,168 | 2/1994 | Smith | 416/203 |
| 5,299,914 | 4/1994 | Schilling | 416/203 |
| 5,306,119 | 4/1994 | Bandoh et al. | 416/168 |
| 5,498,136 | 3/1996 | Namura et al. | 416/193 R |

FOREIGN PATENT DOCUMENTS

| 131436 | 2/1929 | Switzerland | 416/193 R |
|---|---|---|---|

OTHER PUBLICATIONS

*Flutter of Turbofan Rotors with Mistuned Blades*, Krishna Rao V. Kaza and Robert E. Kielb, AIAA Journal, Nov., 1984, vol. 22, No. 11, pp. 1618–1625.

*Aerodynamic Detuning Analysis of an Unstalled Supersonic Turbofan Cascade*, D. Hoyniak and S. Fleeter, Journal of Engineering for Gas Turbines and Power, Jan. 1986, vol. 108, pp. 60–67.

*Primary Examiner*—Edward K. Look
*Assistant Examiner*—Michael S. Lee
*Attorney, Agent, or Firm*—Kenneth C. Baran

[57] ABSTRACT

An array (32) of flow directing elements such as fan blades (20) for a turbine engine (10) is disclosed. Each blade in the array has a set of circumferentially shrouds (42, 44) whose contact edges (46, 48) abut each other during engine operation. A shroud angle $\sigma$ establishes the running chord angle $\alpha$ of the airfoil (30) portion of the array. Slight differences in the shroud angles of adjacent blades cause corresponding differences in the running chord angles so that the array is detuned and airfoil flutter is precluded.

6 Claims, 4 Drawing Sheets

FLUTTER RESISTANT BLADES, VANES AND ARRAYS THEREOF FOR A TURBOMACHINE

TECHNICAL FIELD

This invention relates to shrouded blades and vanes for turbomachines and more particularly to arrays of shrouded blades or vanes having improved flutter resistance.

BACKGROUND OF THE INVENTION

Turbomachines such as gas turbine engines used for propulsion and power generation employ arrays of flow directing elements such as rotating blades and nonrotating vanes to exchange energy with a working medium fluid, typically air, flowing through the engine. Each blade and vane has an airfoil portion which can be susceptible to flutter. Flutter is a self excited aeroelastic phenomenon in which airfoil vibration is induced by coupling between the smoothly flowing working medium and the elastic deformation of the airfoil. The aerodynamic forces exerted on the airfoil add energy and increase the vibratory amplitude and stresses during each vibration cycle. In extreme cases, the vibratory amplitude and stresses become large enough to cause structural failure of the blade or vane. Although flutter can occur in both blades and vanes, experience shows that the airfoil of a rotating fan blade is particularly susceptible to flutter.

One factor which contributes to flutter susceptibility is the highly uniform character of blades and vanes resulting from the modern manufacturing and quality assurance techniques used in their production. Uniformity is generally considered to be desirable since it reduces the likelihood that a blade or vane will have to be discarded or reworked due to violation of manufacturing tolerances. Unfortunately, uniformity of blades and vanes in an array can also reinforce any tendency of an airfoil to flutter during engine operation. This is particularly true if, as is customary, the circumferential spacing between adjacent blades or vanes is also uniform.

Flutter susceptibility as described above is greater in newly manufactured engines, or engines which have been refurbished with new blades or vanes, than in engines which have accumulated numerous hours of service. Uniformity induced flutter susceptibility diminishes during normal service because the blades and vanes experience erosion and other minor mechanical distortions which introduce enough variability to substantially eliminate airfoil flutter. However it may take many hours of engine operation to accumulate sufficient variability or nonuniformity to preclude flutter. Therefore it is desirable to intentionally introduce flutter resisting variability or nonuniformity into the blades and vanes of new and refurbished engines. The introduced nonuniformity ensures flutter resistance during the first several hundred hours of operation.

It may also be the case that an engine manufacturer has produced engines which, due to the higher variability inherent in older, less efficient manufacturing processes, have never been susceptible to flutter. From time to time a small number of blades or vanes in an array may be rendered unserviceable due to damage sustained during operation. The replacements for the damaged blades or vanes may be newly manufactured blades or vanes having flutter resisting nonuniformity. Therefore the compatibility between newly manufactured blades and vanes, which incorporate intentional nonuniformity to resist flutter, and existing blades and vanes, which do not include such nonuniformity, must be ensured.

It is also important not to compromise the aerodynamic performance of blade or vane arrays by the inclusion of flutter resisting nonuniformity.

The provision of nonuniformity in a blade array (in the context of rotating stall avoidance rather than flutter avoidance) is addressed in U.S. Pat. No. 3,536,417 issued to Stiefel et al. Stiefel teaches, among other things, the use of a varying angle of incidence on every other blade in an array. However no specific means for achieving such alternation is taught. Stiefel also teaches cutting back the leading edge of selected blades to achieve circumferential nonuniformity. This approach may be unattractive for modern gas turbine engines since their airfoil contours are complex and the machining operations are correspondingly time consuming and expensive. Moreover, the aerodynamic performance of modern engines may be compromised by such variations in the leading edge geometry.

In U.S. Pat. No. 4,863,351, Fischer et al. teach the provision of circumferential nonuniformity (in the context of noise control) by using blades whose longitudinal blade axes are oriented differently from the neck axes to effect different sweep angles of the airfoils. However this approach suffers from the disadvantage that a damaged blade must be replaced with one having the same blade axis orientation so that the balance of the rotor is preserved. As a consequence, multiple types of blades must be manufactured and maintained in inventory. Economy of scale in manufacturing is thus sacrificed and spare parts inventory management is complicated and made more costly.

What is needed is a blade or vane which incorporates intentional variability to improve flutter resistance without compromising aerodynamic performance or compatibility with existing blades or vanes which do not have such variability. Moreover, economy of manufacturing and ease of inventory management must be ensured.

DISCLOSURE OF THE INVENTION

It is therefore an object of the present invention to provide a blade or vane which has enough variability, in comparison to otherwise identical blades or vanes, that flutter susceptibility of a judiciously arranged array of such blades or vanes is reduced or eliminated.

It is a further object of the invention to ensure compatibility and interchangeability between blades and vanes according to the invention and prior art blades and vanes which do not intentionally incorporate flutter resisting variability.

It is a further object of the invention to incorporate a flutter resisting feature which does not significantly increase the difficulty or expense of manufacturing blades and vanes and which does not complicate spare parts inventory management or compromise engine performance.

According to the invention, shrouded flow directing elements, such as a blade or vane, belong to multiple classes, each of which is distinguished from the other classes by the magnitude of a shroud angle unique to that class, and the flow directing elements are arranged in an array so that no more than a predetermined maximum number of elements of the same class are adjacent to each other.

In one embodiment of the invention there are exactly two classes of flow directing elements and the predetermined maximum number of adjacent elements of the same class is zero so that the elements in the array alternate circumferentially between the classes.

The primary advantage of the invention is the improved flutter resistance of blade and vane arrays having blades and vanes constructed according to the invention.

Other advantages include the compatibility and interchangeability of blades and vanes according to the invention with those of the prior art, the simplicity and minimal cost of introducing variability, and the absence of any performance penalty associated with the invention.

The foregoing features and advantages and the operation of the invention will become more apparent in light of the following description of the best mode for carrying out the invention and the accompanying drawings.

BEST MODE FOR CARRYING OUT THE INVENTION

Figure 1:
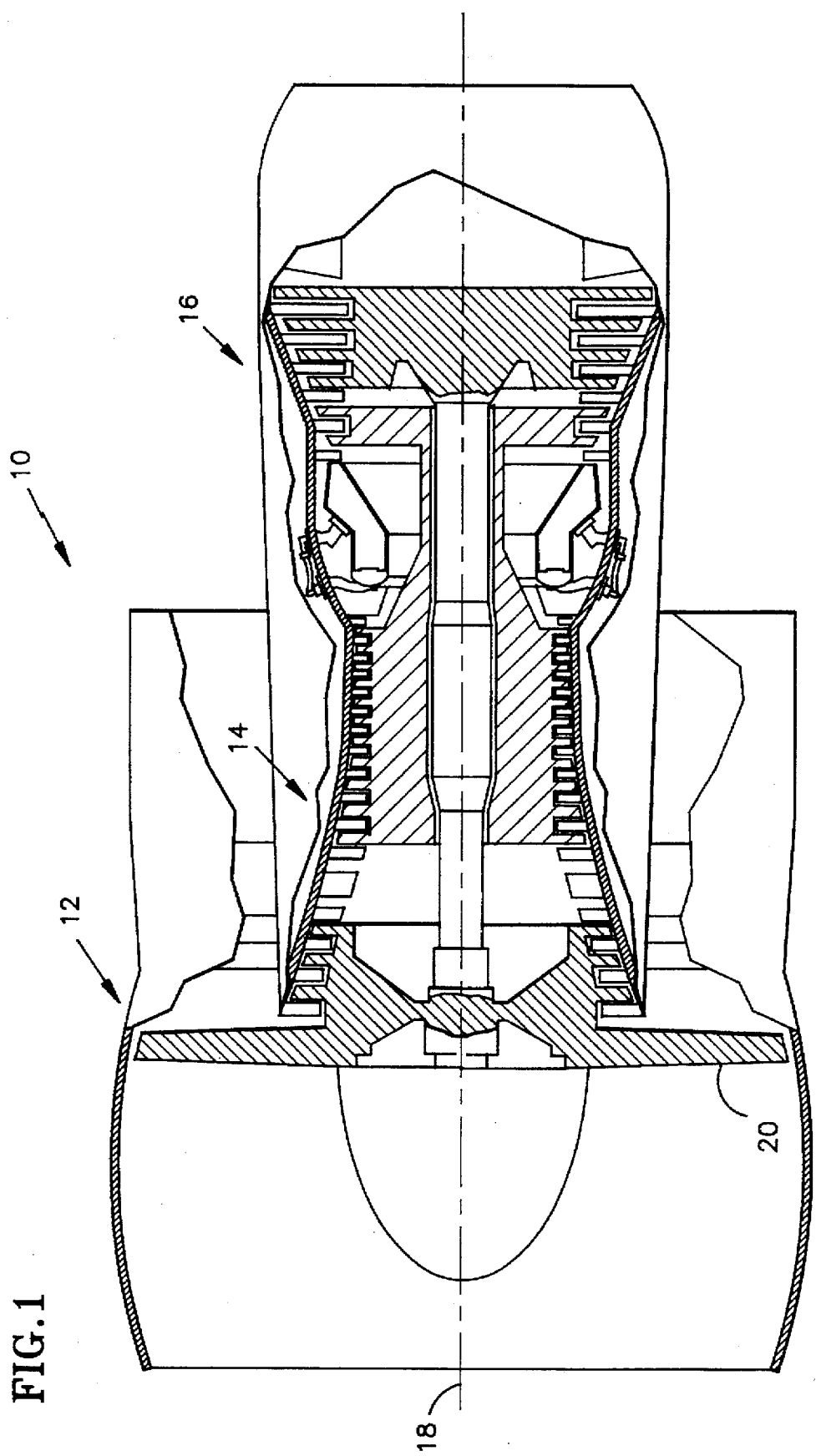
FIG. 1 is a schematic side view of an aircraft gas turbine engine.

Referring to FIG. 1, an aircraft gas turbine engine 10 includes a fan section 12, a compression section 14 and a turbine section 16. The fan, compression and turbine sections include circumferentially extending arrays of flow directing elements, such as rotating blades and nonrotating vanes. Airfoil portions of the flow directing elements extend radially across an engine flowpath for exchanging energy with a working medium fluid flowing through the engine. The rotating components of the engine rotate about a longitudinally extending central axis 18.

The arrays of flow directing elements, particularly the arrays of large, rotating fan blades 20, are susceptible to flutter. Accordingly, the invention is presented in the context of a fan blade, although those skilled in the art will recognize the invention's applicability to any blade or vane array susceptible to flutter.

Figure 2:
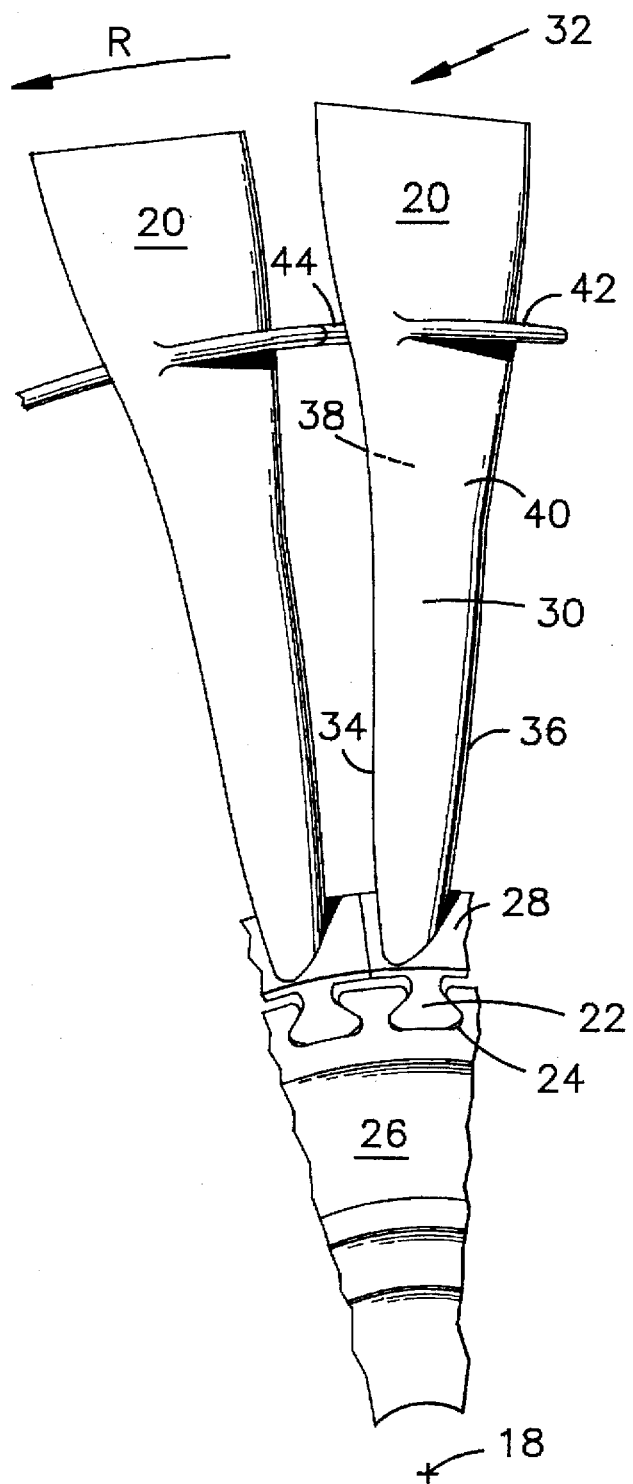
FIG. 2 is a front view of a portion of the fan blade array of a gas turbine engine illustrating typical features of the fan blades and the array.
Figure 3:
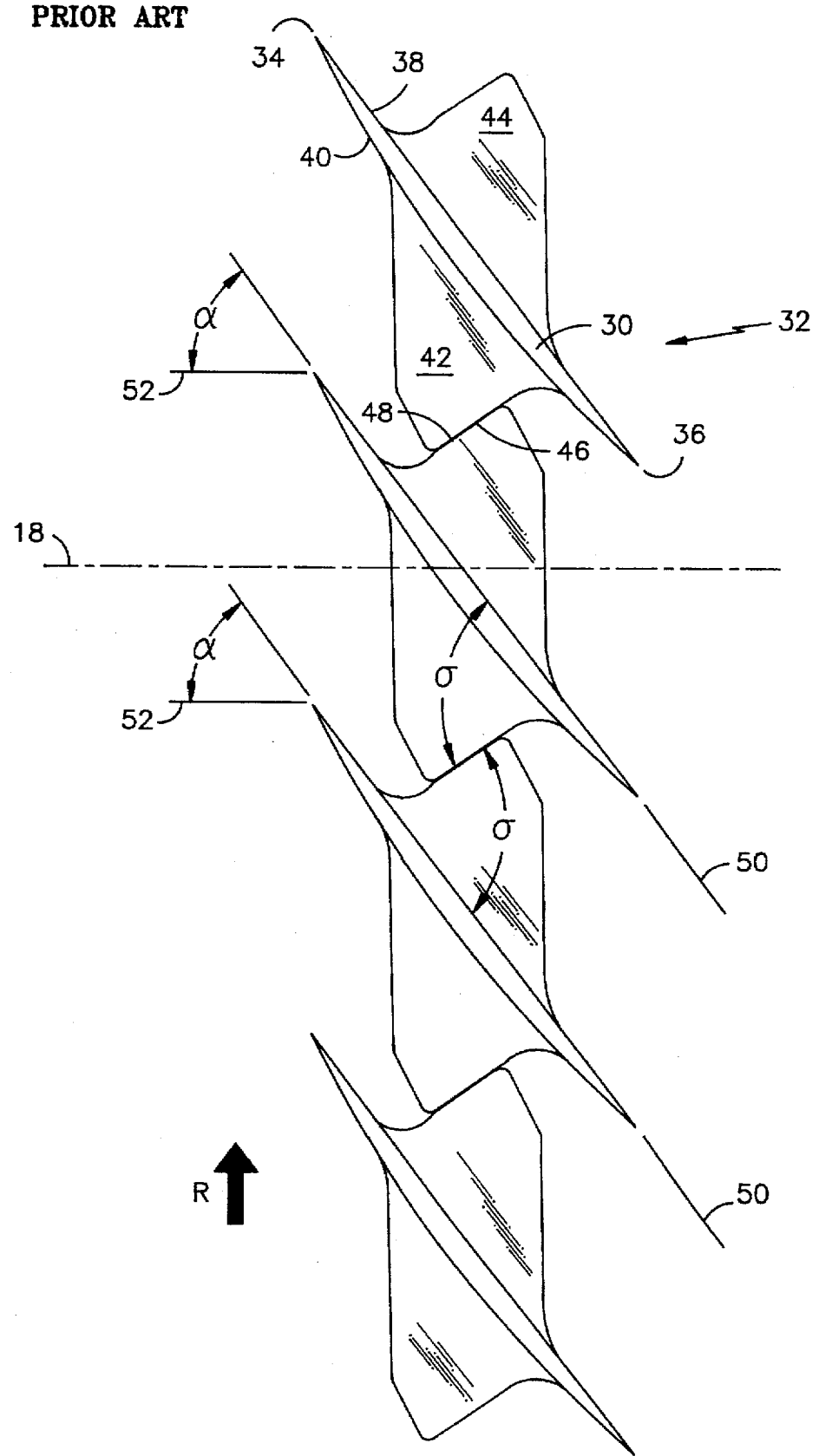
FIG. 3 is a developed view, looking radially inward, of four prior art fan blades of a prior art fan blade array showing the abutting contact between neighboring shrouds and the resultant airfoil running chord angle during engine operation.

Referring to FIGS. 2 and 3, each fan blade 20 includes a dovetail shaped attachment 22 which fits somewhat loosely into a corresponding slot 24 in a rotatable fan disk 26 which rotates in direction R. Each blade includes a platform 28, and an airfoil 30 extending radially outward from the platform. Multiple fan blades are installed around the circumference of the disk to form a blade array as indicated by the partial array 32. The platforms of adjacent blades in the array abut each other to form an inner flowpath boundary, and the airfoils extend radially outward across the flowpath. Each airfoil has a leading edge 34, a trailing edge 36, a pressure surface 38 and a suction surface 40. Each airfoil also has a part span shroud set comprising a suction surface shroud 42 extending circumferentially from the suction surface and a pressure surface shroud 44 extending circumferentially from the pressure surface. As is evident in FIG. 2, each fan blade is twisted about its spanwise axis.

When the engine is not operating, the general orientation of each blade is governed by the mating of the dovetail attachment 22 with the disk slot 24. However the exact orientation of each blade in the array is indeterminate due to the loose fit between the blade attachment and the disk slot, along with the absence of centrifugal and aerodynamic forces on the blade. Neighboring shrouds may or may not be in contact and, if in contact, may not be in complete contact. During engine operation, centrifugal and aerodynamic forces untwist each blade in the array so that contact edge 46 of each suction surface shroud abuts contact edge 48 of the pressure surface shroud of the neighboring blade in the array. The abutting contact between neighboring shrouds helps to limit the untwisting of the blade and establish the blade's exact orientation.

More specifically, and as seen best in FIG. 3, each shroud set has a shroud angle $\sigma$ associated therewith. The shroud angle defines the orientation of the shroud contact edges 46, 48 relative to the chord line 50 (a straight line passing through the leading edge 34 and the trailing edge 36 of the airfoil), or relative to any other convenient reference line on the blade. During engine operation, the abutting contact between neighboring shrouds establishes the running chord angle, $\alpha$ between the chord line 50 and a reference line 52 parallel to the engine axis 18. In prior art blades, the shroud angle $\sigma$ of each blade is ideally (i.e. to the extent achievable in view of manufacturing repeatability) the same as the shroud angle $\sigma$ of all other blades so that each airfoil in the array operates at the same running chord angle $\alpha$. In practice, variability inherent in the forging and machining processes used to make prior art blades is manifested as variability in the shroud angle from blade to blade. Consequently, there are slight variations in the running chord angle during engine operation.

Any variability in a manufacturing process is considered undesirable since it increases the likelihood that a blade will exceed blueprint tolerances. These blades must be reworked or, in extreme cases, scrapped. The waste of materials, time and human resources is unacceptable in a competitive environment. Accordingly, manufacturers are continually upgrading the repeatability of their manufacturing processes and the stringency of their quality assurance techniques, to achieve improved repeatability.

Manufacturing repeatability is clearly desirable for achieving high production yields. However we have determined that the uniformity of the resulting blades tunes the blade array and is responsible for increased flutter susceptibility. This is especially true when the blades are uniformly spaced around the circumference of the disk, as is customary. Accordingly it is desired to intentionally introduce controlled variability into the running chord angle of an array of fan blades. The controlled variability detunes the array thereby precluding flutter.

According to the invention, an array of fan blades for a turbine engine includes blades belonging to at least two classes. The blades of each class are distinguished from those of other classes by a shroud angle unique to that class. The blades are arranged in the array so that no more than a predetermined maximum number of blades of the same class are adjacent to each other.

Figure 4:
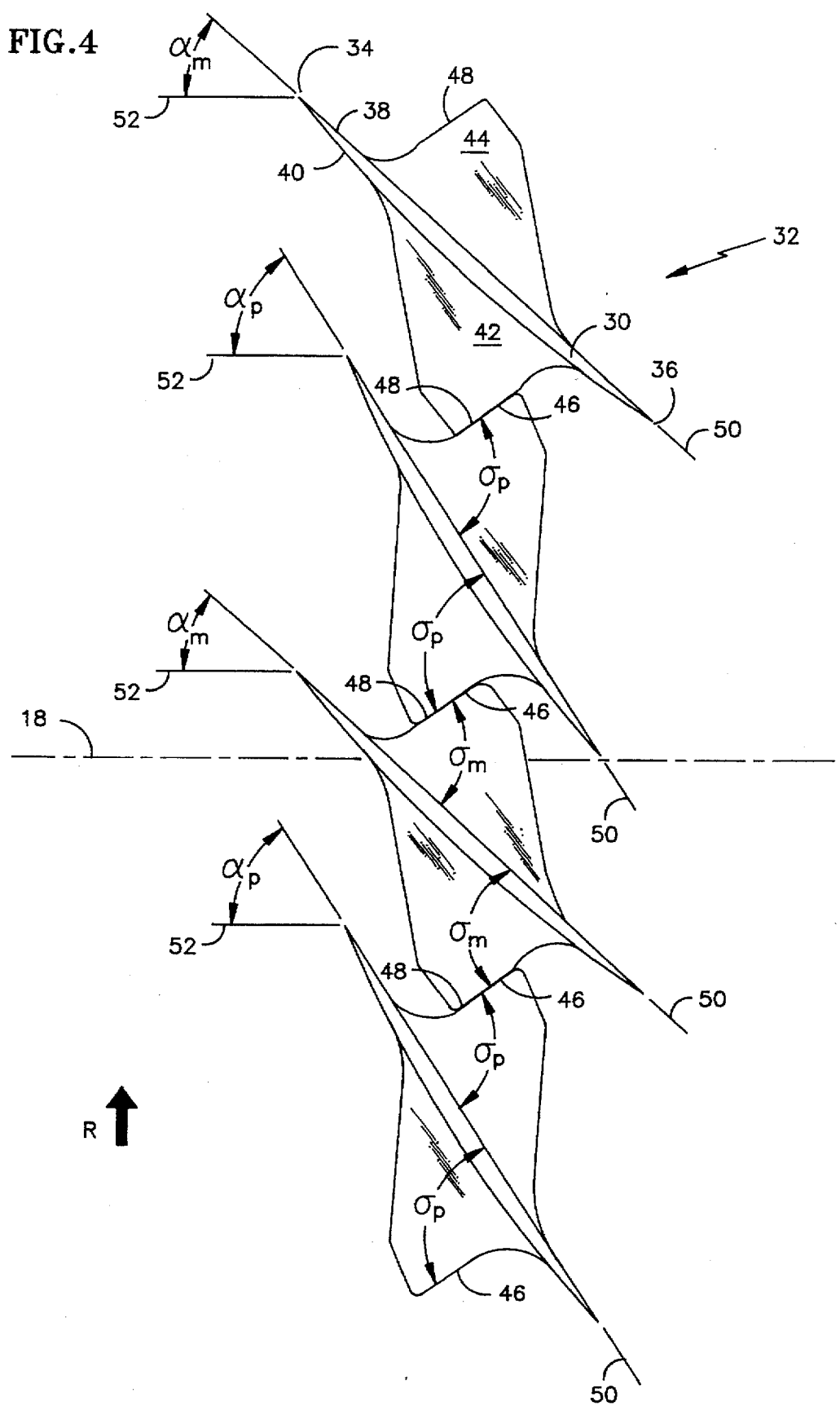
FIG. 4 is a developed view, looking radially inward, of four fan blades of a fan blade array according to the invention showing the abutting contact between neighboring shrouds and the resultant airfoil running chord angles during engine operation.

FIG. 4 illustrates a portion of a blade array according to a dual class embodiment of the invention. Class P blades have a shroud angle $\sigma_p$ which is slightly larger than the shroud angle $\sigma$ of a prior art blade. Class M blades have a shroud angle $\sigma_m$ which is slightly smaller than the shroud angle $\sigma$ of a prior art blade. The shroud angles depicted in FIG. 4 were chosen to emphasize the class differences and are not necessarily representative of angles that would be effective in practice. In all other respects the blades of class M are identical (within manufacturing tolerances) to those of class P. The blades are arranged in the array so that the blades of the two classes are circumferentially alternating, that is, the predetermined maximum number of blades of the same class adjacent to each other is zero. During engine operation, the blades untwist until the shroud contact faces 46, 48 are in abutting contact. The abutting contact prevents any further untwisting of the blades relative to each other and establishes circumferentially alternating running chord angles $\alpha_p$ and $\alpha_m$ for the P and M class blades respectively. This intentionally introduced variability or nonuniformity precludes blade flutter.

The ordering of blades in a rotating array can sometimes be constrained by rotor balance considerations. Each blade's mass distribution is determined prior to the blade being installed in an array. It is desirable to install blades of similar mass distribution at positions 180 degrees opposite each other in the array so that each blade nullifies the other blade's tendency to imbalance the rotating rotor. It may occur that the best rotor balance is achieved by installing a nonzero quantity of blades of the same class adjacent to each other. The flutter resisting properties of the array are not defeated, nor is local susceptibility to flutter created by the presence of these single class clusters, provided that the number of blades in a cluster is limited to a predetermined maximum. For example, the commercial gas turbine engine for which the invention was developed has a fan blade array with 34 blades, and the predetermined maximum number is four. Thus, the size of a cluster is no more than 12 percent of the total quantity of blades in the array.

The permissibility of single class clusters of blades also simplifies the replacement of blades which become damaged during service. It is customary to preserve the dynamic balance of the rotating array by replacing not only each damaged blade, but also the opposing blade in the array (i.e. the blade 180 degrees opposite the damaged blade), even if the opposing blade is undamaged. To ensure dynamic balance of the rotor, a set of replacement blades is a matched pair of blades in which the mass distributions of the two blades are nearly identical. In accordance with the invention, one blade of the matched pair is a class M blade and the other is a class P blade. Due to the permissibility of single class clusters, a damaged blade of one class can be replaced with a replacement blade of the other class. For example, in an array of the inventive blades, the class M blade of a P,M,P triplet can be replaced with a class P blade resulting in a P,P,P triplet (and an opposing M,M,M triplet. Despite the presence of the single class clusters, the array remains flutter resistant since the predetermined maximum number (four) is not exceeded.

If two or more adjacent blades in an array of the inventive or prior art blades are damaged beyond serviceability, their replacement with blades of the invention can be carried out without regard for the class of the replacement blades. Local flutter will not be induced because when multiple adjacent blades and the opposing blades are replaced with matching pairs of the inventive blades—each pair having a class P class blade and a class M blade—the likelihood of more than four replacement blades of the same class being installed adjacent to each other is exceedingly remote, even if the blade pairs are installed without regard for alteration of their classes. Thus, replacement of damaged blades is simplified since maintenance personnel can install multiple pairs of replacement blades without regard for their classes.

One advantage of the invention is that the variation of running chord angle, although effective for preventing flutter in an array of new blades, is small enough that the aerodynamic performance of the array is not compromised. This is true for arrays of new blades as well as arrays in which inventive blades are intermixed with older blades. A collateral advantage is that blades of the present invention are compatible and interchangeable with blades of the prior art.

Flow directing elements of the present invention are easily produced without significant modifications to the manufacturing process used for prior art blades. The blades are forged to a near net shape and then finish machined to the final shape. Production of two classes of blades is readily accomplished by merely bifurcating the production line for shroud machining into two parallel lines—one for class P and one for class M. Moreover, machining slightly different shroud angles is a simple, inexpensive operation.

The best mode for carrying out the invention has been presented in the context of two classes of flow directing elements, however more than two classes may be used without departing from the spirit and scope of the invention. As with the dual class embodiment, the elements are arranged in an array so that no more than a predetermined maximum number (including zero) of elements of the same class are adjacent to each other in the array. The elements may be arranged in repeating, ordered series (for example P, M, Q, R; P, M, Q, R; . . . for a four class embodiment), in repeating unordered series (e.g. P, M, Q, R; M, Q, R, P; . . . ) or in a random fashion (e.g. P, M, Q, M, R, P, Q . . . ) provided only that the resulting running chord angles exhibit sufficient variability to preclude flutter. The number of classes, the predetermined maximum number of blades of the same class adjacent to each other in an array, the predefined maximum number of single-class clusters, the shroud angle and the running chord angle will depend on several factors. These include the severity of the flutter problem to be addressed and the undesirability of producing numerous classes of elements.

Although the invention has been presented in the context of a rotating fan blade having a part span shroud, the invention also includes nonrotating vanes. In typical turbomachinery vanes, the shrouds which limit relative untwisting of the vanes in an array are usually located at one or both spanwise extremities of the vane rather than at a part span position.

We claim:

1. An array of flow directing elements for a turbine engine, each element in the array having an airfoil extending across a flowpath for a working medium, each airfoil having a suction surface shroud extending from the suction surface of the airfoil and a pressure surface shroud extending from the pressure surface of the airfoil so that during operation of the engine the suction surface shroud of each airfoil abuts the pressure surface shroud of the neighboring airfoil to establish the running chord angles of the airfoils, the array characterized in that:

the elements are of at least two classes, the elements of each class being distinguished from the elements of the other classes by a shroud angle unique to that class; and, the elements are arranged in the array so that no more than a predetermined maximum number of elements of the same class are adjacent to each other, thereby detuning the array and precluding airfoil flutter.

2. The flow directing element array of claim 1 characterized in that there are exactly two classes and the predetermined maximum number is zero.

3. The flow directing element array of claim 1 characterized in that there are exactly two classes and the predetermined maximum number is nonzero.

4. The flow directing element array of claim 3 characterized in that the predetermined maximum number is no greater than twelve percent of the total quantity of elements in the array.

5. The flow directing element array of claim 1 characterized in that the flow directing elements are fan blades.

6. A fan blade for an array of such blades in a turbine engine, each blade having an airfoil, a suction surface shroud extending from the suction surface of the airfoil and a pressure surface shroud extending from the pressure surface of the airfoil so that during operation of the engine the shrouds abut the shrouds of adjacent blades in the array to establish the running chord angle of the airfoils, the shrouds having a shroud angle associated therewith, the blade characterized in that:

the magnitude of the shroud angle distinguishes the blade from otherwise identical blades having a different magnitude shroud angle so that the distinguished blades and the otherwise identical blades can be judiciously arranged in the array to detune the array and preclude airfoil flutter.

* * * * *